United States Patent
Crombez

(10) Patent No.: US 8,942,889 B2
(45) Date of Patent: Jan. 27, 2015

(54) VEHICLE CONTROL SYSTEM AND METHOD

(75) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 653 days.

(21) Appl. No.: 12/684,952

(22) Filed: Jan. 10, 2010

(65) Prior Publication Data

US 2011/0160962 A1 Jun. 30, 2011

(51) Int. Cl.
*B60K 26/02* (2006.01)

(52) U.S. Cl.
CPC ..................................... *B60K 26/02* (2013.01)
USPC ................ 701/41; 701/23; 701/24; 701/31.4; 180/197; 180/315; 180/333; 280/124.1; 280/771

(58) Field of Classification Search
CPC ...... B62D 5/0463; B62D 7/159; B62D 6/008; B62D 6/003; B60T 8/1755
USPC ................. 701/70, 23, 22, 24, 41, 51, 1, 117; 180/336, 333, 6.5, 197, 315, 54.1, 180/65.1; 307/10.1; 280/771, 775, 781, 280/124.1
See application file for complete search history.

(56) References Cited

U.S. PATENT DOCUMENTS

| | | | |
|---|---|---|---|
| 5,923,096 A | | 7/1999 | Manak |
| 5,938,282 A | * | 8/1999 | Epple .......................... 297/217.3 |
| 6,827,174 B2 | * | 12/2004 | Chernoff et al. .............. 180/333 |
| 6,948,740 B2 | * | 9/2005 | Chernoff et al. .............. 280/775 |
| 6,997,281 B2 | * | 2/2006 | Chernoff et al. .............. 180/333 |
| 2001/0054522 A1 | * | 12/2001 | Larsson et al. ................ 180/287 |
| 2003/0037975 A1 | * | 2/2003 | Chernoff et al. ............. 180/65.2 |
| 2003/0127261 A1 | * | 7/2003 | Borroni-Bird et al. ...... 180/65.1 |
| 2004/0018800 A1 | * | 1/2004 | Caiozza ........................ 446/454 |
| 2004/0099468 A1 | * | 5/2004 | Chernoff et al. .............. 180/409 |
| 2004/0195014 A1 | * | 10/2004 | Chernoff et al. ............. 180/65.1 |
| 2005/0023071 A1 | * | 2/2005 | Ahnafield ..................... 180/333 |
| 2005/0052080 A1 | * | 3/2005 | Maslov et al. ............... 307/10.1 |
| 2005/0274563 A1 | * | 12/2005 | Ahnafield ..................... 180/336 |
| 2012/0123655 A1 | * | 5/2012 | Kurata ............................ 701/70 |
| 2012/0245765 A1 | * | 9/2012 | Medwin et al. .................. 701/2 |
| 2012/0283894 A1 | * | 11/2012 | Naboulsi ........................... 701/1 |

OTHER PUBLICATIONS

"By Wire" http://jcwinnie.biz/wordpress/?p=1016.
"Car for Disabled Drivers" http://blog.wired.com/gadgets/2006/06/car_for_disabled.html?entry_id=1505237.
"Drive by Wire" http://en.wikipedia.org/wiki/Steer-by-wire.
"How GMs Hy-Wire Works" http://www.howstuffworks.com/hy-wire.htm/printable.
"Hybrids Coming Soon" http://hybridcarcompany.co.uk/hybrid_concepts.php.
"World First Concept Vehicle for Disabled Drivers" http://autoweb.com.au/cms/A_103328/newsarticle.html.

* cited by examiner

*Primary Examiner* — Helal A Algahaim
*Assistant Examiner* — Jelani Smith
(74) *Attorney, Agent, or Firm* — David Kelley, Esq.; Tung & Associates

(57) ABSTRACT

A vehicle control system for a vehicle having an onboard diagnostics connector and a connector interface connected to the onboard connector includes at least one external controller adapted for unfastenable connection to the connector interface; and at least one operator control connected to said at least one external controller.

19 Claims, 2 Drawing Sheets

VEHICLE CONTROL SYSTEM AND METHOD

TECHNICAL FIELD

The present disclosure generally relates to vehicle controls for disabled drivers. More particularly, the present disclosure relates to a by-wire vehicle control system which can be readily connected to a vehicle controller to facilitate operation of a vehicle by a disabled driver and further relates to a vehicle control method.

BACKGROUND

Vehicles such as hybrid electric vehicles (HEVs) may be equipped with hand-operated controls which enable disabled drivers such as paraplegics to operate the vehicles without the need to depress accelerator and brake pedals with the foot. However, conventional controls for disabled drivers may require cumbersome mechanical connections between the user interface and the accelerator pedal, brake pedal and other elements of the vehicle which are to be controlled. These mechanical connections may require an expensive modification to the vehicle as well as interfere with the ability of non-disabled persons to operate the vehicle.

Therefore, a by-wire vehicle control system which can be readily connected to a vehicle controller to facilitate operation of a vehicle by a disabled driver and disconnected from the vehicle controller when not in use is needed.

SUMMARY

The present disclosure is generally directed to a vehicle control system for a vehicle having an onboard connector and a connector interface connected to the onboard connector. An illustrative embodiment of the vehicle control system includes at least one external controller adapted for unfastenable connection to the connector interface and at least one operator control connected to the at least one external controller.

The present disclosure is further generally directed to a vehicle. An illustrative embodiment of the vehicle includes a plurality of vehicle controls, a vehicle communication network computer interfacing with the plurality of vehicle controls, an onboard connector interfacing with the vehicle communication network computer, a connector interface connected to the onboard diagnostics connector and a vehicle control system comprising at least one external controller unfastenably connected to the connector interface and at least one operator control connected to the at least one external controller.

The present disclosure is further generally directed to a vehicle control method. An illustrative embodiment of the vehicle control method includes providing a connector interface for an onboard diagnostics connector of a vehicle, providing operator controls having at least one external controller, connecting the at least one external controller to the connector interface and operating the vehicle using the operator controls.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. Furthermore, there is no intention to be bound by any expressed or implied theory presented in the preceding technical field, background, brief summary or the following detailed description.

Figure 1:
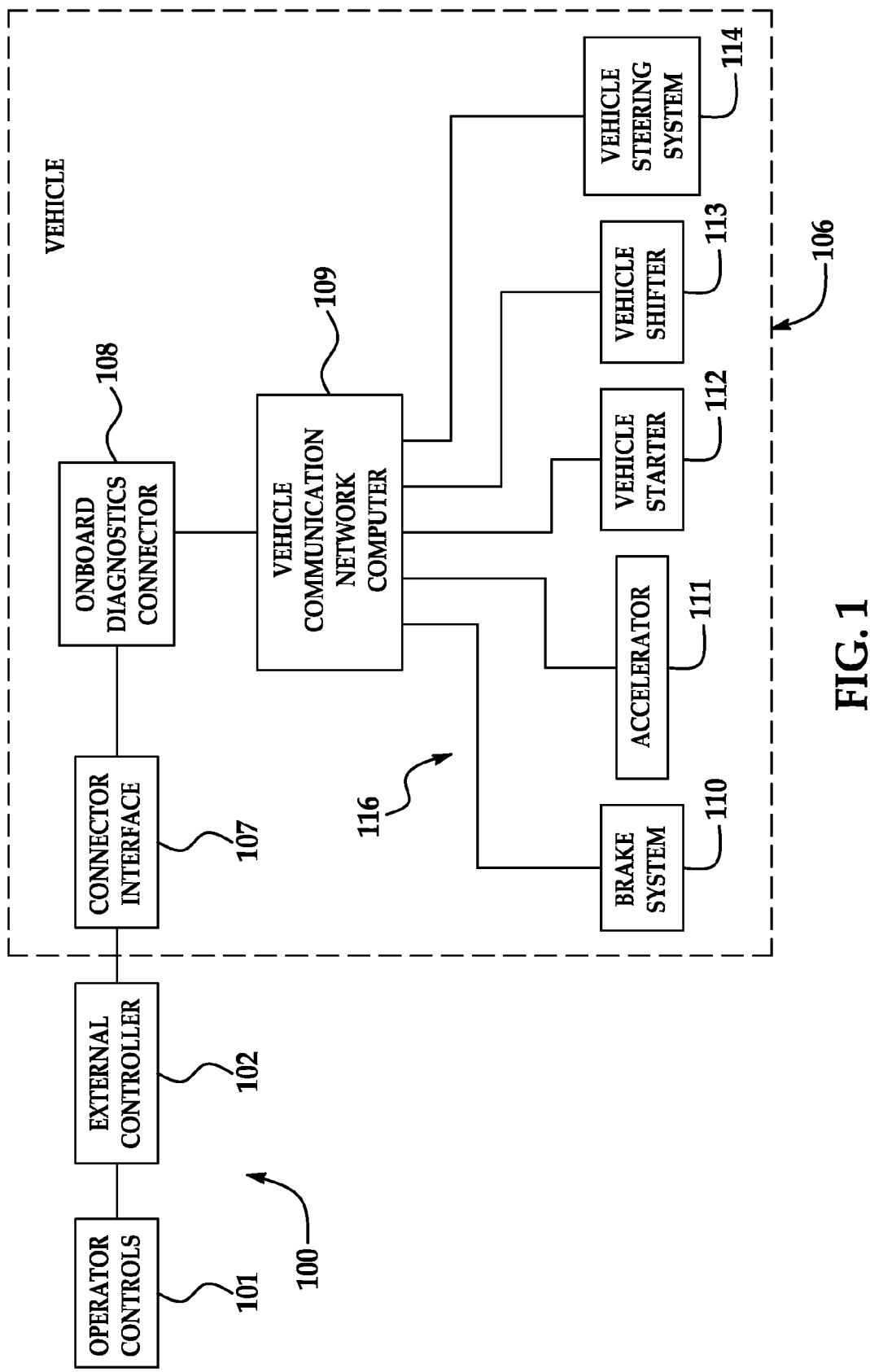
FIG. 1 is a block diagram of an illustrative embodiment of a vehicle control system.
Figure 2:
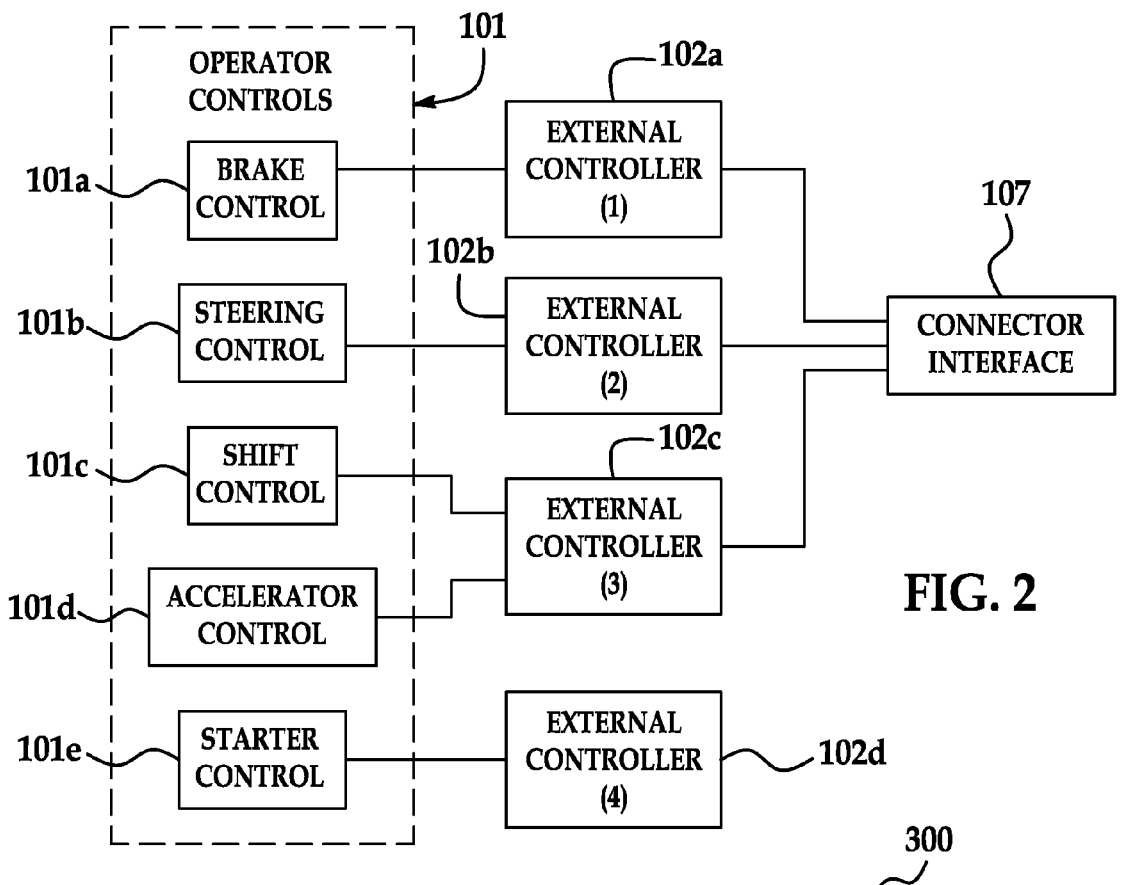
FIG. 2 is a block diagram of various operator controls with multiple external controllers connected to the operator controls according to an illustrative embodiment of the vehicle control system.

Referring initially to FIGS. 1 and 2, an illustrative embodiment of the vehicle control system is generally indicated by reference numeral 100. The vehicle control system 100 may include various operator controls 101 to facilitate operation and control of a vehicle 106. At least one external controller 102 may be connected to the operator controls 101. In some embodiments, the vehicle 106 may be a hybrid electric vehicle (HEV). In other embodiments, the vehicle 106 may be a conventional internal-combustion engine vehicle.

The vehicle 106 may include a connector interface 107. The external controller(s) 102 of the vehicle control system 100 may be adapted for unfastenable connection to the connector interface 107 of the vehicle 106 according to any suitable unfastenable connection arrangement, which is known by those skilled in the art. It may be noted that unfastenable does not necessarily imply that the said connection is not capable of being unfastened when, for example, not required to be fastened, but rather is considered to be fastened at times when the external controller 102 is required to be fastened. An onboard diagnostics connector 108 of the vehicle 106 may be connected to the connector interface 107. In some embodiments, the onboard diagnostics connector 108 may be a standard onboard diagnostics II (OBDII) connector of an HEV. In that case, the onboard diagnostics connector 108 may be located beneath a steering wheel (not shown) of the vehicle 106. In other embodiments, the onboard diagnostics connector 108 may be provided in any suitable alternative location on the vehicle 106. In yet another embodiment, a unique connector, not necessarily devoted to diagnostics, may be provided in addition to or in place of the onboard diagnostics connector 108 and may be provided in any suitable location on vehicle 106. In any case, a vehicle communication network computer 109 may be connected to a connector as exemplarily illustrated with the vehicle communication network computer 109 connected to the onboard diagnostics connector 108.

Various vehicle controls 116 which facilitate control of the vehicle 106 may be connected to the vehicle communication network computer 109. The vehicle controls 116 may include a brake system 110 which facilitates braking of the vehicle 106; an accelerator 111 which facilitates acceleration of the vehicle 106; a vehicle starter 112 which facilitates ignition of the vehicle 106; a vehicle shifter 113 which facilitates transmission shifting of the vehicle 106; and/or a vehicle steering system 114 which facilitates steering of the vehicle 106, for example and without limitation. The external controller(s) 102 may include hardware and supporting software, which is necessary to facilitate operation of the vehicle controls 116 by user manipulation of the operator controls 101. Accordingly, when the external controller 102 is connected to the connector interface 107 of the vehicle 106, the operator controls 101 may be adapted to facilitate hand-operated and/or foot-operated control of at least one of the brake system 110; the accelerator 111; the vehicle starter 112; the vehicle shifter 113; and the vehicle steering system 114 through the external controller(s) 102; the connector interface 107; the onboard diagnostics connector 108; and the vehicle communication network computer 109.

As shown in FIG. 2, in some embodiments the operator controls 101 of the vehicle control system 100 may include separate control elements for each of the vehicle controls 116 of the vehicle 106. For example and without limitation, as shown in FIG. 2, in some embodiments the operator controls 101 may include a brake control 101a which is adapted to control the brake system 110; a steering control 101b which is adapted to control the vehicle steering system 114; a shift control 101c which is adapted to control the vehicle shifter 113; an accelerator control 101d which is adapted to control the accelerator 111; and/or a starter control 101e which is adapted to control the vehicle starter 112.

At least one external controller 102 may interface with each one of the operator controls 101. In some embodiments, a first external controller 102a may interface with the brake control 101a; a second external controller 102b may interface with the steering control 101b; and a third external controller 102c may interface with the shaft control 101c and the accelerator control 101d. A fourth external controller 102d may interface with the starter control 101e. The first external controller 102a, the second external controller 102b, the third external controller 102c and the fourth external controller 102d may be adapted for unfastenable connection to the connector interface 107 according to the knowledge of those skilled in the art. In some embodiments, a single external controller 102 may interface with the brake control 101a, the steering control 101b, the shift control 101c, the accelerator control 101d and the starter control 101e.

The operator controls 101 may be provided in any form which is amenable to manipulation and operation by a disabled operator (not shown) of the vehicle 106. In some embodiments, the operator controls 101 may be provided in the form of a joystick. Accordingly, the accelerator control 101d of the operator controls 101 may be caused to engage the accelerator 111 of the vehicle controls 116 for acceleration of the vehicle 116 by forward movement of the joystick. Conversely, the brake control 101a of the operator controls 101 may be caused to engage the brake system 110 for braking of the vehicle 106 by rearward movement of the joystick. The steering control 101b of the operator controls 101 may be caused to engage the vehicle steering system 114 of the vehicle controls 116 for leftward or rightward steering of the vehicle 106 by movement of the joystick to the left or the right, respectively. In other embodiments, the operator controls 101 may be provided in the form of buttons, switches, levers, pedals, wheels and/or other by-wire elements which can be easily manipulated and operated by a disabled operator, alone or in combination with a joystick or other arrangement.

In typical use of the vehicle control system 100, the external controller(s) 102 of the vehicle control system 100 is/are connected to the connector interface 107 of the vehicle 106. A disabled operator (not shown) of the vehicle 106 may operate the vehicle controls 116 by manipulation of the operator controls 101. In some embodiments, the operator controls 101 of the vehicle control system 100 may include hand-operated controls which facilitate ignition, acceleration, braking, shifting and/or steering of the vehicle 106 without requiring implementation of these functions using the feet of the operator. When use of the vehicle control system 100 is not necessary, the external controller(s) 102 of the vehicle control system 100 may be disconnected from the connector interface 107 of the vehicle 106. Because the vehicle control system 100 may not require the use of mechanical connections between the operator controls 101 and the vehicle controls 116, a non-disabled operator may operate the vehicle 106 in the usual manner after the external controller(s) 102 is/are disconnected from the connector interface 107.

Figure 3:
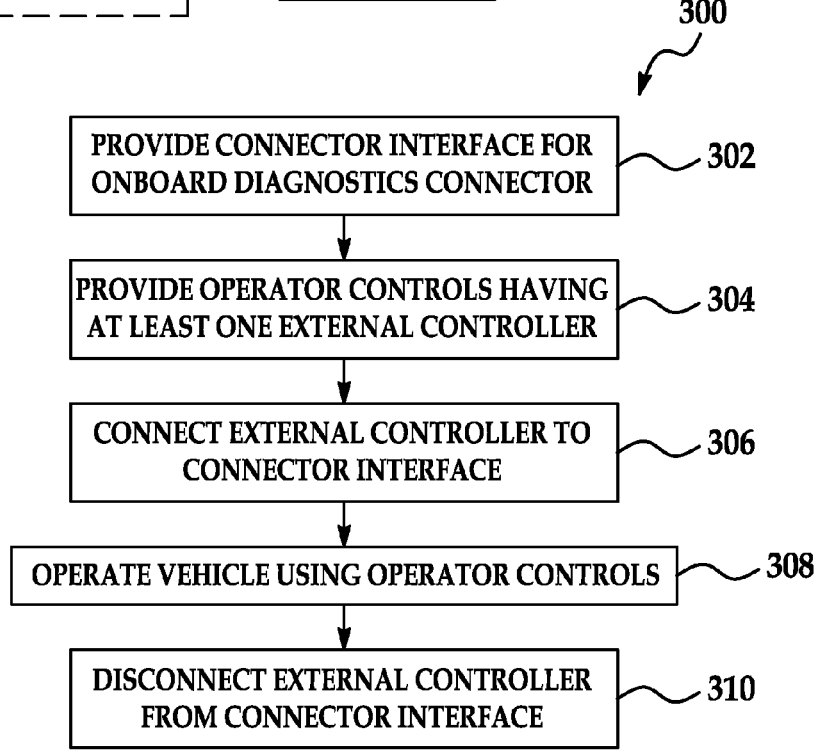
FIG. 3 is a flow diagram of an illustrative embodiment of a vehicle control method.

Referring next to FIG. 3, a flow diagram 300 of an illustrative embodiment of a vehicle control method is shown. In block 302, a connector interface for an onboard diagnostics connector is provided on a vehicle. In block 304, operator controls having at least one external controller are provided. In block 306, the external controller is connected to the connector interface of the vehicle. In block 308, the vehicle is operated using the operator controls. In block 310, the external controller may be disconnected from the connector interface after operation of the vehicle.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A vehicle by-wire control system for a vehicle, said by-wire control system having an onboard connector and a connector interface connected to the onboard connector, said onboard connector interfacing with an onboard vehicle communication network computer, said vehicle communication network computer interfacing with said plurality of vehicle controls, said by-wire control system comprising:
    at least one external controller configured for unfastenable connection by-wire to the connector interface, said external controller separate from said vehicle; and
    at least one operator control connected by-wire to said at least one external controller, said external controller configured to execute programmed instructions stored in non-transitory computer readable memory, said programmed instructions executed in response to operation of said at least one operator control to operate said vehicle controls, said operation by-wire without control of mechanical connections between said operator control and said vehicle controls, said external controller configured to control said vehicle controls through said onboard connector and said vehicle communication network computer, said vehicle by-wire control system configured to enable conventional vehicle control by a driver when said external controller is disconnected from said connector interface, said vehicle controls comprising at least one of an accelerator control and a brake control.

2. The vehicle control system of claim 1 wherein said at least one operator control comprises a plurality of operator controls.

3. The vehicle control system of claim 2 wherein said at least one external controller comprises a plurality of external controllers.

4. The vehicle control system of claim 1 wherein said at least one operator control comprises an accelerator control and a brake control.

5. The vehicle control system of claim 4 wherein said at least one operator control further comprises a steering control.

6. The vehicle control system of claim 4 wherein said at least one operator control further comprises a shift control.

7. The vehicle control system of claim 4 wherein said at least one operator control comprises a starter control.

8. The vehicle control system of claim 1 wherein said at least one operator control comprises a joystick.

9. A vehicle by-wire control system, comprising:,
a plurality of vehicle controls;
a vehicle communication network computer interfacing with said plurality of vehicle controls;
an onboard connector interfacing with said vehicle communication network computer;
a connector interface connected to said onboard connector; and
said vehicle by-wire control system further comprising:
at least one external controller unfastenably connected by-wire to said connector interface, said external controller separate from said vehicle; and
at least one operator control connected by-wire to said at least one external controller, said external controller configured to execute programmed instructions stored in non-transitory computer readable memory, said programmed instructions executed in response to operation of said at least one operator control to operate said vehicle controls, said operation by-wire without control of mechanical connections between said operator control and said vehicle controls, said vehicle by-wire control system configured to enable conventional vehicle control by a driver when said external controller is disconnected from said connector interface.

10. The vehicle control system of claim 9 wherein said plurality of vehicle controls comprises a brake system and an accelerator and said at least one operator control comprises a brake control and an accelerator control.

11. The vehicle control system of claim 10 wherein said plurality of vehicle controls further comprises a vehicle starter and said at least one operator control comprises a starter control.

12. The vehicle control system of claim 10 wherein said plurality of vehicle controls further comprises a vehicle shifter and said at least one operator control comprises a shift control.

13. The vehicle control system of claim 10 wherein said plurality of vehicle controls further comprises a vehicle steering system and said at least one operator control comprises a steering control.

14. The vehicle control system of claim 9 wherein said at least one operator control comprises a plurality of operator controls.

15. The vehicle control system of claim 14 wherein said at least one external controller comprises a plurality of external controllers.

16. The vehicle control system of claim 9 wherein said at least one operator control comprises a joystick.

17. A vehicle by-wire control method, comprising:
providing a connector interface connected to an onboard connector of a vehicle, said onboard connector interfacing with a vehicle communication network computer, said vehicle communication network computer interfacing with a plurality of vehicle controls;
providing operator controls connected by-wire to at least one external controller, said external controller separate from said vehicle, said external controller configured to execute programmed instructions stored in non-transitory computer readable memory, said programmed instructions executed in response to. operation of said operator controls to operate said vehicle controls, said operation by-wire without control of mechanical connections between said operator control and said vehicle controls, said vehicle by-wire control system configured to enable conventional vehicle control by a driver when said external controller is disconnected from said connector interface, said vehicle controls comprising at least one of an accelerator control and a brake control;
unfastenably connecting by-wire said at least one external controller to said connector interface; and
operating said vehicle using said operator controls.

18. The vehicle control method of claim 17 wherein said providing operator controls comprises providing a brake control and an accelerator control and said operating said vehicle comprises braking said vehicle using said brake control and accelerating said vehicle using said accelerator control.

19. The vehicle control method of claim 18 wherein said providing operator controls further comprises providing at least one of a steering control, a shift control and a starter control and said operating said vehicle comprises at least one of steering said vehicle using said steering control, shifting said vehicle using said shift control and starting said vehicle using said starter control.

* * * * *